(12) United States Patent
Mannava et al.

(10) Patent No.: US 7,836,144 B2
(45) Date of Patent: Nov. 16, 2010

(54) SYSTEM AND METHOD FOR A 3-HOP CACHE COHERENCY PROTOCOL

(75) Inventors: Phanindra K. Mannava, Folsom, CA (US); Robert H. Beers, Beaverton, OR (US); Seungjoon Park, Los Altos, CA (US); Brannon Batson, Brooklyn, NY (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 11/647,618

(22) Filed: Dec. 29, 2006
(Under 37 CFR 1.47)

(65) Prior Publication Data

US 2008/0162661 A1    Jul. 3, 2008

(51) Int. Cl.
*G06F 15/167* (2006.01)
(52) U.S. Cl. .................. 709/213; 709/214; 709/202
(58) Field of Classification Search ......... 709/213–214, 709/216, 202; 711/141, 146
See application file for complete search history.

(56) References Cited

U.S. PATENT DOCUMENTS

| | | | |
|---|---|---|---|
| 6,009,488 A | 12/1999 | Kavipurapu | |
| 6,954,829 B2 | 10/2005 | Beers et al. | |
| 7,016,304 B2 | 3/2006 | Chou et al. | |
| 7,434,006 B2 | 10/2008 | Beers et al. | |
| 7,484,014 B2 | 1/2009 | Mannava et al. | |
| 7,506,108 B2 | 3/2009 | Beers et al. | |
| 7,536,515 B2 | 5/2009 | Spink et al. | |
| 7,543,115 B1* | 6/2009 | Batson et al. | 711/141 |
| 7,600,080 B1 | 10/2009 | Bhattacharyya et al. | |
| 7,721,050 B2 | 5/2010 | Hum et al. | |
| 7,738,484 B2 | 6/2010 | Ayyar et al. | |
| 2004/0122966 A1 | 6/2004 | Hum et al. | |
| 2005/0022100 A1 | 1/2005 | Lee et al. | |
| 2005/0144488 A1 | 6/2005 | Lee et al. | |
| 2005/0204193 A1 | 9/2005 | Mannava et al. | |
| 2005/0240734 A1 | 10/2005 | Batson et al. | |
| 2005/0262250 A1 | 11/2005 | Batson et al. | |
| 2005/0262368 A1 | 11/2005 | Cherukuri et al. | |
| 2006/0034295 A1 | 2/2006 | Cherukuri et al. | |
| 2006/0277369 A1 | 12/2006 | Tsien | |
| 2006/0282645 A1 | 12/2006 | Tsien | |
| 2006/0288171 A1 | 12/2006 | Tsien | |
| 2007/0022252 A1 | 1/2007 | Cen | |
| 2007/0033347 A1 | 2/2007 | Tsien | |
| 2007/0055827 A1 | 3/2007 | Tsien | |
| 2007/0055828 A1 | 3/2007 | Tsien | |
| 2007/0073856 A1 | 3/2007 | Tsien | |
| 2007/0073979 A1 | 3/2007 | Tsien | |
| 2007/0079072 A1* | 4/2007 | Collier et al. | 711/133 |
| 2007/0079074 A1* | 4/2007 | Collier et al. | 711/141 |
| 2007/0079075 A1* | 4/2007 | Collier et al. | 711/141 |
| 2007/0130353 A1 | 6/2007 | Chou et al. | |
| 2007/0150664 A1* | 6/2007 | Dombrowski et al. | 711/144 |
| 2007/0233932 A1* | 10/2007 | Collier et al. | 711/100 |
| 2008/0005486 A1 | 1/2008 | Mannava et al. | |
| 2008/0091825 A1 | 4/2008 | Mannava et al. | |

* cited by examiner

*Primary Examiner*—Philip B Tran
(74) *Attorney, Agent, or Firm*—Blakely, Sokoloff, Taylor & Zafman LLP

(57) ABSTRACT

A system and method for implementing a cache coherency protocol are described. The system includes a first caching agent to send a first cache request to a home agent. The system also includes the home agent including a queue to store the first cache request.

17 Claims, 8 Drawing Sheets

SYSTEM AND METHOD FOR A 3-HOP CACHE COHERENCY PROTOCOL

BACKGROUND OF THE INVENTION

1. Field of the Invention

This invention relates to memory coherency. More particularly, the invention relates to a system and method for improving access of coherent memory.

2. Description of the Related Art

Many computing systems today are scalable and include multiple processors and input/output (I/O) agents that interface with I/O and storage devices (e.g., keyboards, mice, joysticks, hard drives, etc.). Many computing systems today also include coherent memories. In some systems, the coherent memory is a coherent cache for multiple processors. With today's cache being included in the processor, a coherent cache means that the processor shares its cache with other agents that may request access to the cache (e.g., other processors or the I/O agent).

When a computing system includes multiple coherent cache memories and multiple request agents like the multiple processors and the I/O agent, a conflict may occur when two agents request access to a cache line at the same time. To alleviate this problem, a system of arbitrating for access to a specific cache line between multiple request agents is typically accomplished by creating a cache coherency protocol.

As the number of caches and/or request agents increases in a computing system, the complexity of maintaining cache coherency also increases as the cache coherency protocol must be adapted to the newly scaled computing system.

In some systems, cache coherency protocols will broadcast snoop requests to all agents that contain coherent cache lines. Then, if multiple requests to the same cache line are received by the agent, the agent arbitrates as to which requestor "wins" and has its request processed. The typical "winner" is the agent whose snoop request is received first. Typically, all agents will run arbitration, even if the agent is not active in the received snoops, in order to determine which agent's requests will be processed. One example of this protocol is the 2-hop snoopy coherency protocol.

One difficulty with the above cache coherency protocol types is that snoops must be sent to every caching agent and arbitration must be handled by every cache agent. Thus, each agent must know which agents exist on the network, which may be difficult in easily scalable systems. For example, for systems that allow remote access (RAS), such as a computing system running Microsoft® NT Operating Environment, each agent of the system would need to know when the remote agent exists and does not exist.

In three-hop protocols, a master agent receives all snoops and determines which snoop will be processed if a conflict arises. The master agent will process the snoop that arrives first. Successive snoops while the master agent is busy will cause the master agent to send a Negative Acknowledgement (NAck) signal back to the caching agent sending the snoop. The caching agent then periodically retries sending the snoop until the snoop is accepted by the master agent (a NAck signal is not received).

One difficulty with the above is that transfer paths, computing resources, and time are taken up by the Retry/NAck process while the master agent is busy.

Therefore, what is needed is an improved cache coherency protocol. What is further needed is an improved system and method for implementing the improved cache coherency protocol.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for a cache coherence protocol are described. This cache coherence protocol is one example of a three-hop out-of-order protocol that utilizes a messaging protocol for implementing a coherent memory system using agents in a network fabric. One example of a network fabric may comprise either or all of: a link layer, a protocol layer, a routing layer, a transport layer, and a physical layer.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

System Architecture

Figure 1:
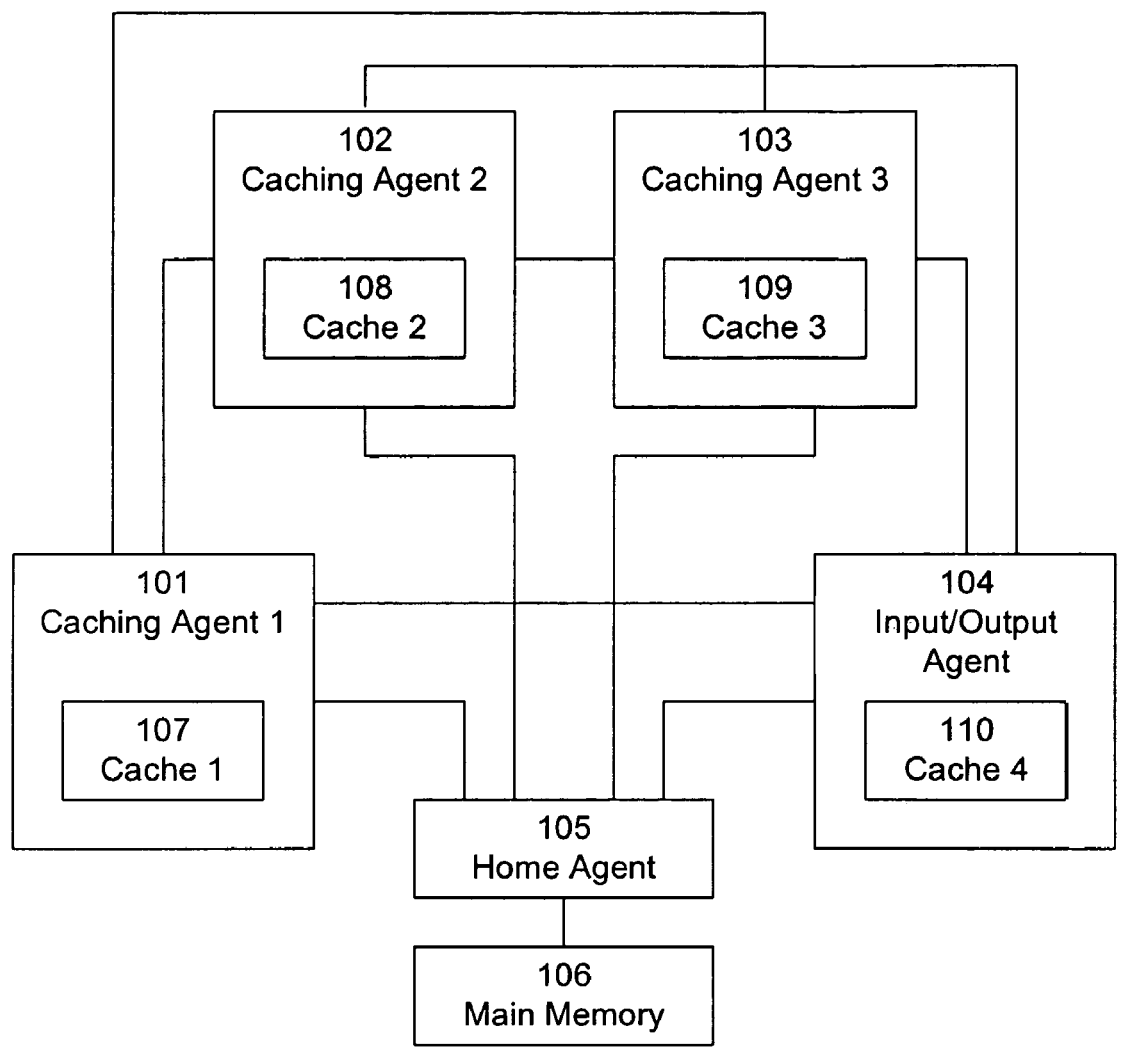
FIG. 1 illustrates a point-to-point architecture of the system for implementing a cache coherency protocol in one embodiment.

FIG. 1 illustrates an exemplary point-to-point architecture of the system for implementing a cache coherency protocol. The system generally comprises: a plurality of sockets or caching agents 101-103, a home agent 105, and a main memory 106. Each of the caching agents include or have access to a cache 107-109. The system may also include an at least one Input/Output (I/O) agent 104 with a cache 110.

The system uses point-to-point (P2P) connections with each of the agents 101-104 directly connected to one another and to the home agent 105. The home agent 105 includes a memory controller that is able to access main memory 106.

Figure 2:
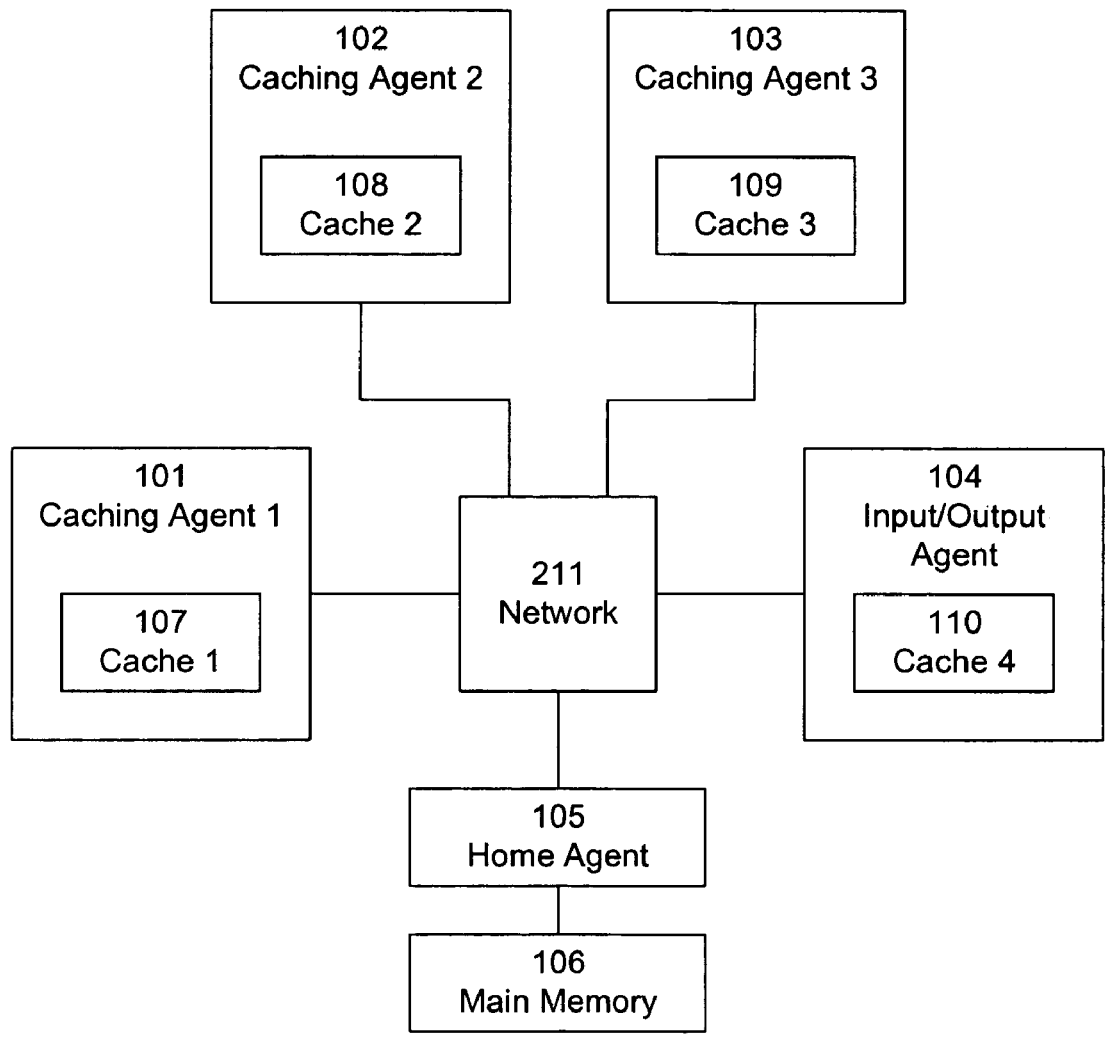
FIG. 2 Illustrates another embodiment of the architecture of the system for implementing a cache coherency protocol.

FIG. 2 illustrates another example architecture of the system. The architecture connects the agents 101-105 to one another through a network 211. The network 211 may be any type of network including a crossbar network.

The caching agent 101-103 in the exemplary architecture is a processor with on-die cache 107-109. The I/O agent 104 interfaces with other devices of the system, such as, for example, a keyboard, mouse, and/or monitor. The I/O agent may include a cache 110 and act as a caching agent for purposes of the cache coherence and messaging protocol.

In order to cache snoop, the agents 101-104 send cache requests (also called snoop requests or requests) to the home agent 105.

The home agent 105 is the unit that manages the cache coherency protocol and accesses to the main memory 106 for some process requests. The home agent 105 includes a table for holding pending snoops in the system and a queue for holding requests that cannot be processed or sent at the present time.

he table contains the snoops that are pending in the system at the present time. For example, if Caching Agent 2 (102) is requesting a cache line that is in Caching Agent 3 (103) and the snoop has been sent by Home Agent (105) to Caching Agent 3 (103) without response, a copy of the sent snoop would be stored in the table because the snoop is presently pending. Generally, the table holds at most one snoop for each cache line of an agent 101-104. For example, if a request being processed by Home Agent 105 is sent for cache line A of Caching Agent 1 (101) (e.g., Home Agent 105 sent the snoop to cache line A of Caching Agent 1), the table holds only the request or snoop sent to Caching Agent 1 (101) as the one entry for cache line A of Caching Agent 1 (101). In the exemplary embodiment, the table is a group of registers wherein each register contains one request. The table can be of any size, such as 16 or 32 registers, and may depend on the number of agents, caches, and/or cache lines in the system.

The queue contains the requests that cannot be processed or sent by the home agent 105 at the present time. For example, if Home Agent 105 is processing a request from Caching Agent 1 (101) for a specific cache information, Home Agent 105 cannot process another request for the same cache information while processing the request from Caching Agent 1 (101). One specific example is Caching Agent 2 (102) sends a request to Home Agent 105 for the information on the same cache line that Cache 1 (107) of Caching Agent 1 (101) requested. Thus, Home Agent 105 stores the request from Caching Agent 2 (102) in the queue.

The queue allows for out-of-order processing of requests sequentially received. In an example embodiment, the queue is a buffer, such as a First-In-First-Out (FIFO) buffer.

The home agent 105 also includes a directory of the information stored in all caches of the system. The directory need not be all-inclusive (e.g., the directory does not need to contain a list of exactly where every cached line is located in the system) as will be discussed later.

The system implements the MESI (Modified, Exclusive, Shared, Invalid) or MESIF (Modified, Exclusive, Shared, Invalid, Forwarded) protocol.

Cache Coherency Protocol

In implementing a three-hop cache coherency protocol, the following guidelines are followed by the system:
snoops are sent to destination caching agents by the home agent 105;
at most one snoop may be present per cache line of an agent 101-104 at one time; and
the home agent 105 maintains a directory of the information stored in cache.

Figure 8:
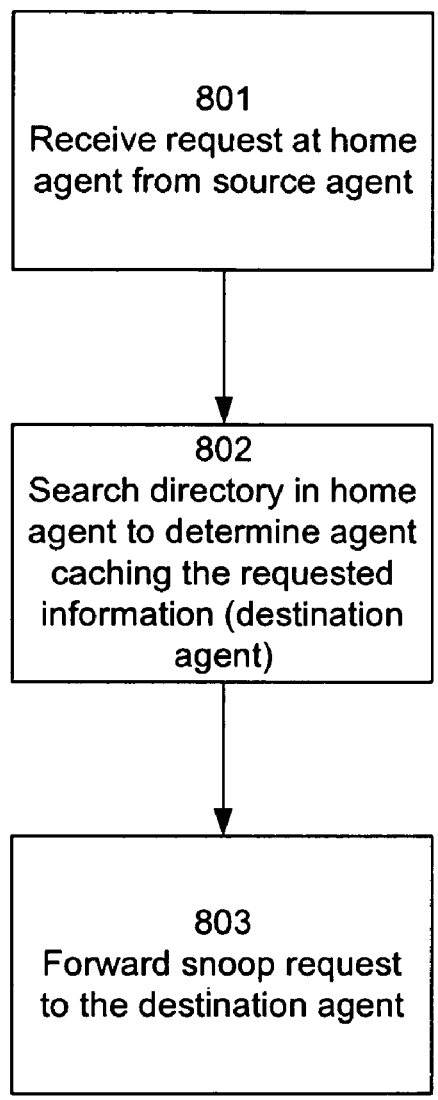
FIG. 8 illustrates a flow-chart of the home agent receiving a request from a source caching agent and forwarding a snoop with the request to a correct destination caching agent.

Following the above guidelines, FIG. 8 illustrates a flowchart of an exemplary flow using the cache coherency protocol when the home agent 105 is available to process a request. At 801, a request from a source agent 101-104 is received by the home agent 105. At 802, the home agent 105 determines a destination agent for the received request by determining which caching agent is caching the requested information. This determination is made by looking in the directory of the home agent 105. Once the home agent 105 determines the destination agent for the request, the home agent 105 sends a snoop to the destination agent at 803. In the exemplary embodiment, the snoop is part of the request sent to the home agent 105.

As previously stated, the home agent 105 may not be able to process an incoming request immediately upon reception. For example, if the home agent 105 is processing another request at the present time, the home agent 105 cannot immediately process an incoming request. Therefore, the incoming request or snoop is stored by the home agent 105 to be processed at a later time. The request or snoop to be stored is stored in the queue of the home agent 105.

The home agent 105 uses the table and queue so that communications from the home agent 105 to other agents 101-104 remain pre-allocated while pending requests exist in the system. For example, when a pending request for a cache information X has ended, the pending request or snoop is removed from the table of the home agent 105. The queue is set up so that the request or snoop for the cache information X that is next-in-time may be processed by the home agent 105. Therefore, the request or snoop would be pending and thus moved to the table.

When a caching agent 101-104 receives a snoop from the home agent 105, the receiving caching agent 101-104 (destination agent) services the snoop. If information stored in the cache 107-110 of the destination agent is requested by the source agent, the destination agent sends the information to the source agent.

Figure 3:
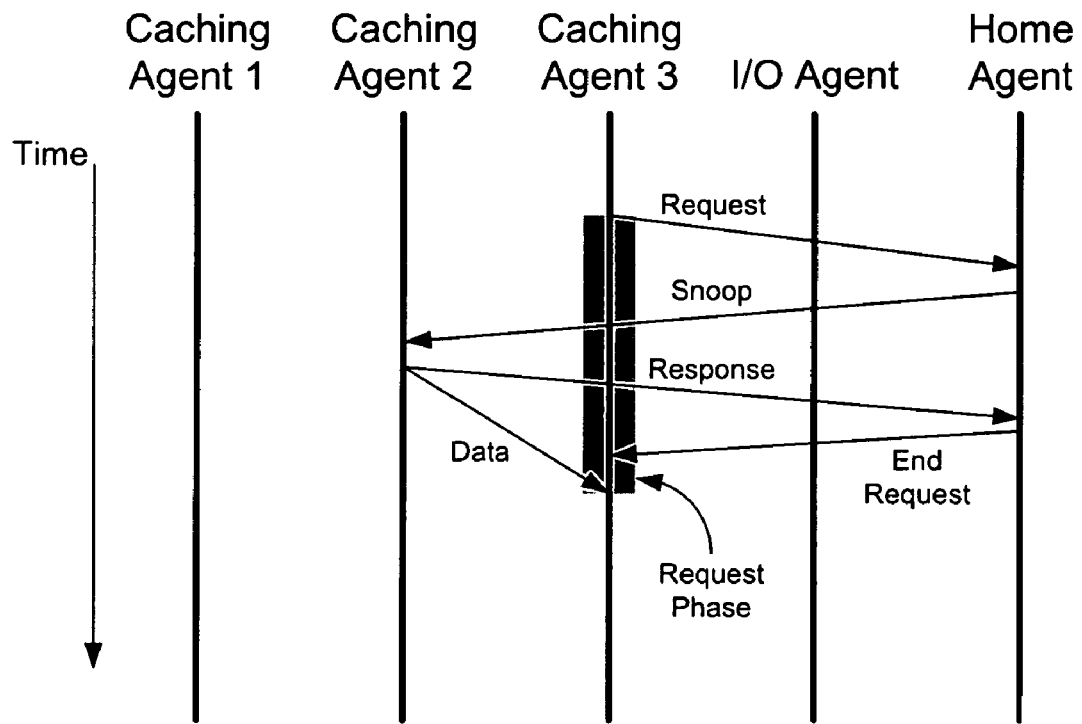
FIG. 3 illustrates an example process request flow in one embodiment of the present invention.
Figure 4:
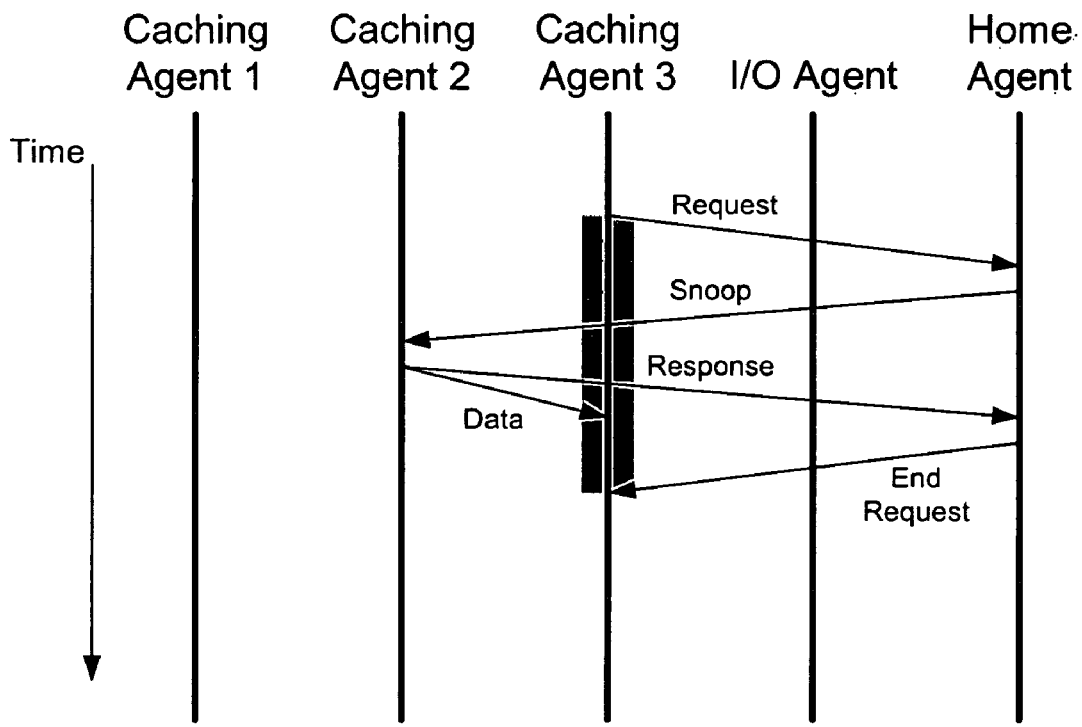
FIG. 4 illustrates another example process request flow.

FIGS. 3 and 4 illustrate examples of a request from Caching Agent 3 being processed by the home agent. Referring to FIGS. 3 and 4, caching agent 3 sends a request to caching agent 2 through the home agent 105. Caching agent 3 is in a request phase until the request has ended (a response has been received). While the caching agent is in a request phase, the caching agent does not act as a destination agent and does not send another request to the home agent for the same cache line.

Once the home agent determines that caching agent 2 is the destination agent, the snoop from the request from caching agent 3 is transmitted to caching agent 2. Caching agent 2 processes the snoop. If the snoop instructs transferring some information stored in the cache of caching agent 2 to caching agent 3, caching agent 2 sends the information to caching agent 3. Caching Agent 2 also sends a response to the home agent indicating it has completed work on the snoop. Upon receipt of the response from caching agent 2, the home agent sends an end request signal specifying that the request has been completed and removed from the home agent.

For some requests sent to the home agent by other agents, the home agent will not have an entry in its directory for the requested information because the other agents do not have the needed information cached. Therefore, the home agent will access main memory and directly send the requested information to the caching agent requesting the information (source agent).

Different delays exist in the architecture. For example, differing lengths of traces may cause differing delays for data traveling along those traces. In addition, response times of agents may differ from one another. As a result, data from the destination agent and the end request signal from the home agent may arrive at different times and in different orders. Therefore, FIGS. 3 and 4 illustrate that the request phase of a source agent ends upon receipt of both the information from the destination agent and the end request signal from the home agent.

Also as a result of the delays in the system (e.g., the delay between transmission and reception of a signal), request conflicts can occur. A conflict occurs when the home agent receives two or more requests for the same cache information at approximately the same time. The two or more requests means that the two or more source agents are in a request phase at the same time. If the source agent for one request is the destination agent for the other request regarding the same cache information or cache line, a conflict arises because an agent in a request phase is unable to become a destination agent for the same cache information or cache line. Hence, a conflict resolution scheme is implemented in the exemplary cache coherency protocol.

Conflict Resolution

Figure 5:
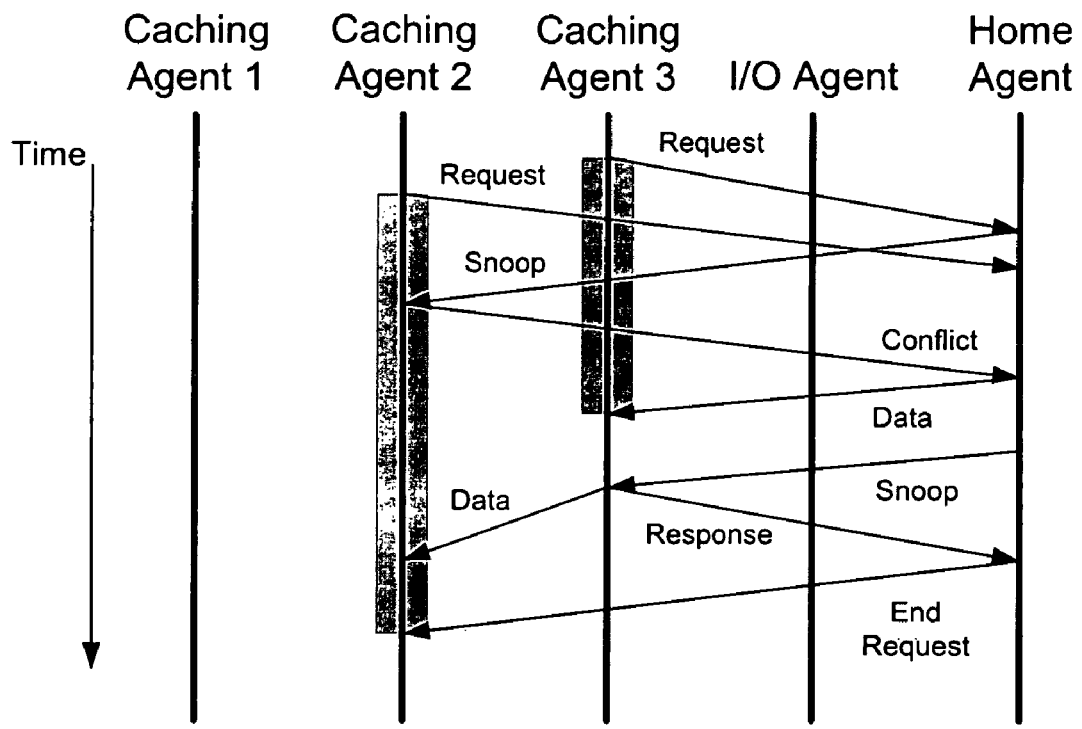
FIG. 5 illustrates an "Early Conflict" resolution scheme example implementing the present exemplary cache coherency protocol.
Figure 6:
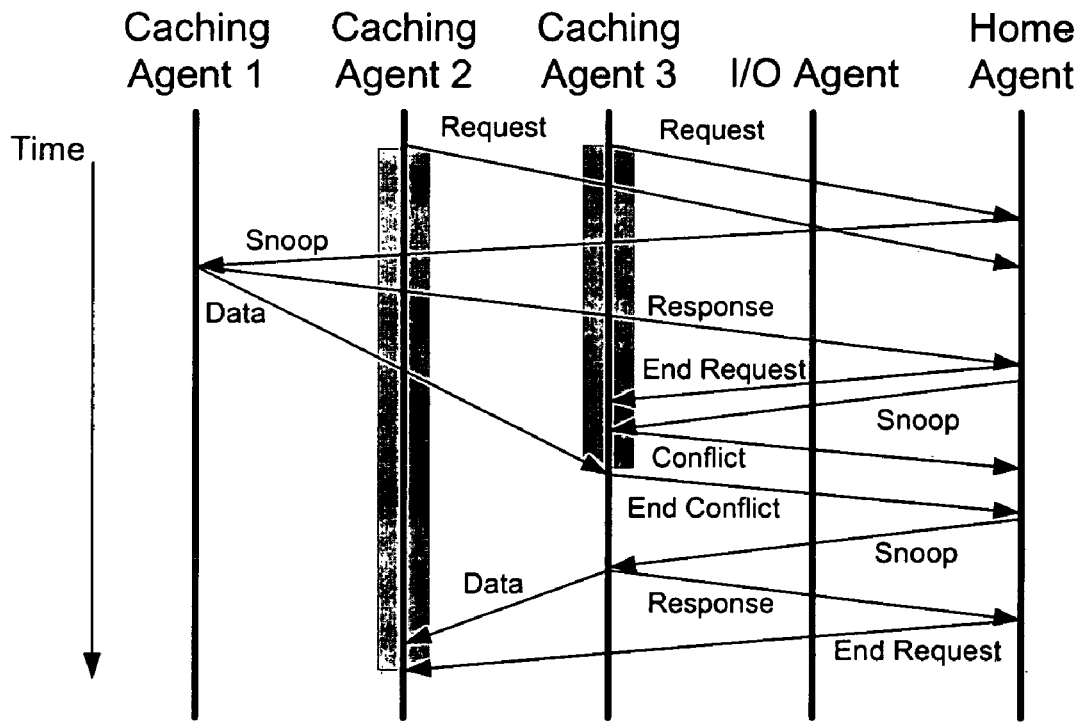
FIG. 6 illustrates a "Late Conflict" resolution scheme example implementing the present exemplary cache coherency protocol.

Two types of conflicts may occur: an "early conflict" or a "late conflict." An "early conflict" is a conflict with a source agent for whom the home agent has yet to send the "End Request" signal to. FIG. 5 illustrates an example of an "early conflict" and its resolution. A "late conflict" is a conflict in which the home agent has already sent the "End Request" signal to the conflicting source agent but the request phase for the conflicting source agent has not yet ended. FIG. 6 illustrates an example of a "late conflict" and its resolution. The illustrated conflicts are for multiple requests for the same cache information or involving the same cache line.

Referring to the "early conflict" resolution example of FIG. 5, caching agent 3 sends a request to the home agent, where caching agent 2 is the destination agent. Before caching agent 2 receives the corresponding snoop from the home agent, caching agent 2 sends a request to the home agent wherein caching agent 3 is the destination agent. Thus, both caching agents 2 and 3 are in a request phase.

Upon receiving the second request, the home agent knows through its table that a snoop is pending wherein caching agent 3 is the source agent (i.e., caching agent 3 is in a request phase). Hence, the home agent stores the request from caching agent 2 in the queue until the pending request from caching agent 3 is completed.

While in a request phase, caching agent 2 receives the snoop forwarded from caching agent 3 by the home agent. Since caching agent 2 is in a request phase, caching agent 2 sends a conflict signal to the home agent to notify the home agent that it cannot process the snoop at the present time. Accordingly, upon receiving the conflict signal, the home agent accesses main memory to satisfy the request from caching agent 3. The home agent retrieves the requested information from main memory and sends the information to caching agent 3.

When caching agent 3 sees that it is receiving the requested information from the home agent, it ends its request phase upon completion of receiving the information. In the exemplary embodiment, the home agent automatically deletes the pending snoop from the table without needing to send an "End Request" signal. In another embodiment, the "End Request" signal is sent with the data to the source agent.

After the snoop for caching agent 3's request is no longer pending, the home agent can process caching agent 2's request that is stored in the queue. In processing the request, the snoop is forwarded to caching agent 3 (i.e., the destination caching agent). Upon receipt of the snoop, caching agent 3 retrieves the information from its cache and sends the information to caching agent 2. Caching Agent 3 also sends a response to the home agent indicating it is servicing the received snoop. Upon receipt of the response, the home agent sends an "end request" signal to caching agent 2 (i.e., the source agent). Caching agent 2 ends its request phase upon receiving both the information from caching agent 3 and the "end request" signal from the home agent.

Referring to the "late conflict" resolution example of FIG. 6, the home agent receives a request from caching agent 3 with caching agent 1 as the destination agent. In processing the request, the home agent forwards the snoop to caching agent 1 and stores a copy of the snoop in its table. The home agent then receives a request from caching agent 2 where caching agent 3 is the destination agent. The home agent sees that a request is pending for caching agent 3. Therefore, the home agent stores the request from caching agent 2 in its queue.

Upon caching agent 1 receiving the snoop, caching agent 1 retrieves the requested information from its cache and sends the requested information to caching agent 3. Caching agent 1 also sends a response signal to the home agent to notify the home agent that it has processed the snoop. Upon receiving the response signal from caching agent 1, the home agent sends an "end request" signal to caching agent 3 and removes the pending snoop for caching agent 3 from the table.

Once the snoop is no longer pending for caching agent 3, the home agent may process the request from caching agent 2 stored in the queue. As previously stated, the destination agent for the request from caching agent 2 is caching agent 3. Since the home agent has already sent the "end request" signal for the previous processed request to caching agent 3, the home agent believes that caching agent 3 is free to receive a snoop (i.e., no pending snoop exists in the home agent's table for caching agent 3). Therefore, the home agent forwards the snoop of the processed request to caching agent 3.

As illustrated in the example in FIG. 6, caching agent 3 receives the information from caching agent 1 much later than when the home agent sends the "end request" signal to caching agent 3 for the request. Since caching agent 3 does not end its request phase until it receives the wanted information from caching agent 1, caching agent 3 is in a request phase when it receives the snoop forwarded by the home agent.

As a consequence of being in request phase when receiving a request, caching agent 3 sends a "conflict" signal to the home agent to notify the home agent that it is still in a request phase. When the home agent receives the "conflict" signal, it waits for the conflict to be resolved by caching agent 3 before resending the snoop. In another embodiment, the home agent directly services the conflicting request by accessing main memory to gather any requested information for caching agent 2.

When caching agent 3 receives the information from caching agent 1, caching agent 3 ends its request phase. In the exemplary embodiment, caching agent 3 recognizes a conflict existed during its request phase. Hence, caching agent 3 sends an "end conflict" signal to the home agent. The "end conflict" signal notifies the home agent that the conflict is resolved and the home agent can now forward the snoop to caching agent 3. Caching agent 3 receives the snoop, sends the requested information to caching agent 2 (the source agent), and sends a response signal to the home agent to notify the home agent that it has processed the snoop.

Upon the home agent receiving the response signal from caching agent 3, the home agent sends an "end request" signal to caching agent 2 and removes the pending snoop from the table. Once caching agent 2 receives the requested information from caching agent 3 and the "end request" signal from the home agent, caching agent 2 ends its request phase.

Other examples of early and late conflicts exist. The system implementing the exemplary cache coherency protocol will use the same steps as illustrated in FIGS. 5 and 6 and discussed above to resolve those conflicts.

Home Agent Directory

As previously described, the home agent includes a directory of the information stored in all caches of the system. Since the home agent services all cache requests, the home agent must know where to direct snoops. In order for the home agent to direct snoops, the home agent should have some ability to determine where requested information is stored. The directory is the component that helps the home agent determine where information in the cache of the system is stored.

In the exemplary embodiment, the directory is another table (e.g., a memory grid or bank of registers). The directory contains identifiers of the information currently stored in the system's caches. The directory also contains pointers linking the identifiers to at least one caching agent. For example, cache 1 (107) of caching agent 1 (101) (FIG. 1) exclusively contains data X on one cache line. In one example, the directory of the home agent 105 contains an identifier to data X and a pointer linking the identifier to caching agent 1 (101). The home agent 105 uses the stored identifier to determine that data X is stored somewhere in the system's caches. The home agent uses the pointer to determine that the cache of caching agent 1 stores data X. The home agent also uses the pointer to determine the state of the information (e.g., whether the information is exclusive, shared, invalid, modified, etc.).

As a result of the home agent containing a directory for the entire system's cache, the directory must be updated so that the home agent will successfully forward snoops after many changes have already been made to cache. Thus, if information (e.g., data X) is deleted from the entire system's caches, the home agent removes the identifier(s) of the information from the directory. If information changes caches (e.g., data X moves from caching agent 1 to caching agent 2), the home agent updates the pointer(s) attached to the identifier(s) of the information in the directory so that it links the new caching agent to the information identifier.

The home agent receives update information from the other agents through requests and the responses from source and destination agents. For example, referring to FIG. 3, when the home agent receives a request for specific information (e.g., data X) from caching agent 3, the home agent is alerted that the identifier of the information or pointers linked to the identifier may need to be changed in the directory. In a more specific example, through the MESIF or MESI protocol, a request to read information exclusive to another agent alerts the home agent that the pointer will need to be updated.

Referring back to FIG. 3, the home agent confirms from the received response signal from caching agent 2 whether the directory is to be updated. Such as in the specific example, a response that caching agent 3 has read information exclusive to caching agent 2 confirms that the home agent is to update the pointer linking the identifier of the read information to caching agent 2 so as to now link caching agent 3.

When shared information is also updated in one sharing cache but not in another (e.g., a cache line is rewritten where the original information was shared by multiple caches), the home agent receives a response signal from the caching agent containing the updated information. The home agent invalidates pointers linking the information to other sharing caching agents with the old information. The home agent may also update main memory upon receiving the response signal.

The directory may be all-inclusive, meaning an identifier exists in the directory for each cache line in the system, but the cache coherency protocol does not require the directory to be as complete or inclusive. More specifically, the home agent should know (i.e., the directory should contain) what information is in the system's caches, but the home agent does not need to know exactly which caches contain which information (i.e., the pointers in the directory do not need to always point to a specific caching agent). For example, for shared information, no pointer may exist. Thus, the home agent assumes that all caching agents share the information. If the home agent receives a request for the shared information, then the home agent broadcasts the received snoop to the entire system.

Figure 7:
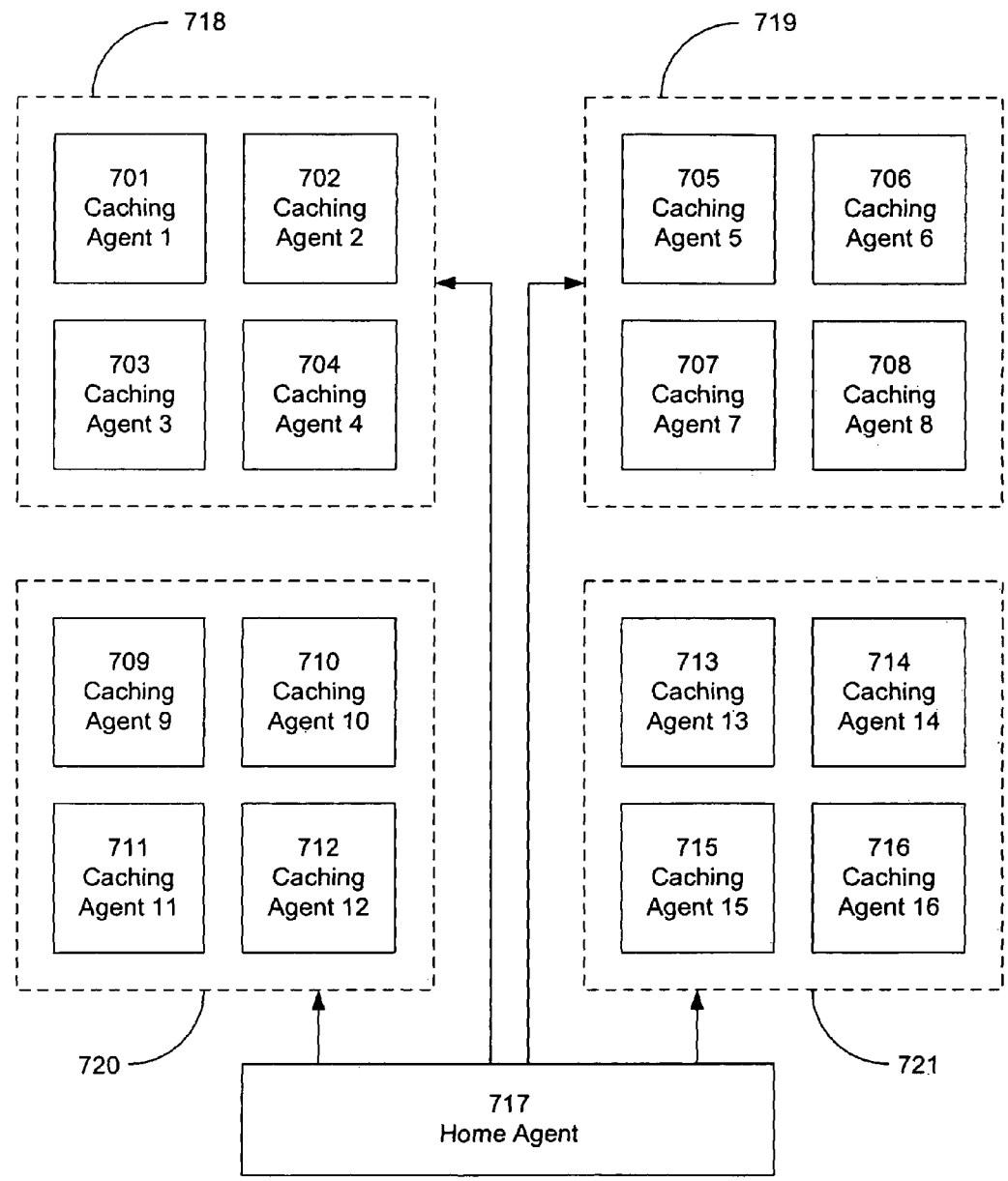
FIG. 7 illustrates an example hierarchical organization of an example architecture of the present invention.

In the exemplary embodiment, the directory uses a hierarchical organization of the system's caching agents. FIG. 7 illustrates an exemplary organization of a hierarchy of an example system for the directory. In the system, sixteen caching agents 701-716 are directly connected to the home agent 717 as in FIG. 1. If information is exclusively held in the cache of caching agent 15 (715), the pointer in the directory links caching agent 15 (715) to the information identifier. Alternatively, the pointer in the directory links the group 721 of caching agents 13-16 (713-716) to the information identifier.

For shared information, though, the directory divides the caching agents 701-716 into a hierarchy, or groups of four 718-721. If information is shared by two agents within a group (e.g., caching agents 5 and 6 [705, 706] share data X), the pointer in the directory will link the information identifier to the group of agents 719. Therefore, the home agent sends the snoop of a request for the shared information to all of the agents in the group (e.g., caching agents 5-8 [705-708]).

If the information is shared by agents of multiple groups (e.g., caching agent 11 [711] and caching agent 2 [702]), multiple pointers exist in the directory to link the multiple groups containing the sharing agents to the information identifier (e.g., one pointer linking group 718 and one pointer linking group 720). If more than a predetermined number of groups contain agents that share specific information (e.g., more than two groups contain caching agents sharing data X), no pointer exists in the directory for the information identifier. Therefore, the home agent broadcasts a snoop of a received request for the shared information to all of the caching agents (e.g., caching agents 1-16 [701-716]).

A hierarchical organization of the system's caching agents for purposes of the directory reduces the number of pointers necessary. Reducing the number of pointers decreases the amount of memory needed to construct a directory. In scalable systems where the number of agents is large, the decrease may be necessary in order to make the size of memory to construct the directory manageable. In addition, less time will have to be spent by the home agent updating directory as some requests will not require updating the directory (e.g., transfer of information between two caching agents in the same group).

In addition to updating identifiers and pointers in the directory, for systems that allow scaling of the system while the system is active (e.g., remote access [RAS] on business servers), the home agent is able to update the size and/or topology of the directory. For example, the home agent allocates space in the directory for any new caching agents. The home agent removes allocated space in the directory to a deleted caching agent. Furthermore, to initially build the directory in the home agent in the exemplary embodiment, the home agent determines what caching agents and caches exist upon system initialization. From that information, the home agent constructs the directory.

In the above description, specific embodiments of the present invention are described. Different embodiments of the present invention exist that do not deviate from the scope of the invention. For example, lines of the caching agents having conflicts have been described, but the cache coherency protocol may be implemented for each caching agent of the caches instead of the cache lines. Thus, a caching agent can be in an overall request phase or have a conflict over a cache line, and would be unable to process other snoops and/or requests for lines of the cache outside of the cache line causing the conflict or the caching agent to be in a request phase.

Caching agents may be or be part of a processor which comprises at least one processing core or multiple cores and on-processor or on-chip cache. In addition, a memory controller may exist in each caching agent or processor so that each caching agent has direct access to main memory. Also, a system of processors may be configured so that one processor is the home agent and the remaining processors are caching agents for the cache coherency protocol.

Embodiments of the invention may be implemented in a variety of electronic devices and logic circuits. Furthermore, devices or circuits that include embodiments of the invention may be included within a variety of computer systems, including a point-to-point (P2P) computer system and shared bus computer systems. Embodiments of the invention may also be included in other computer system topologies and architectures.

Figure 9:
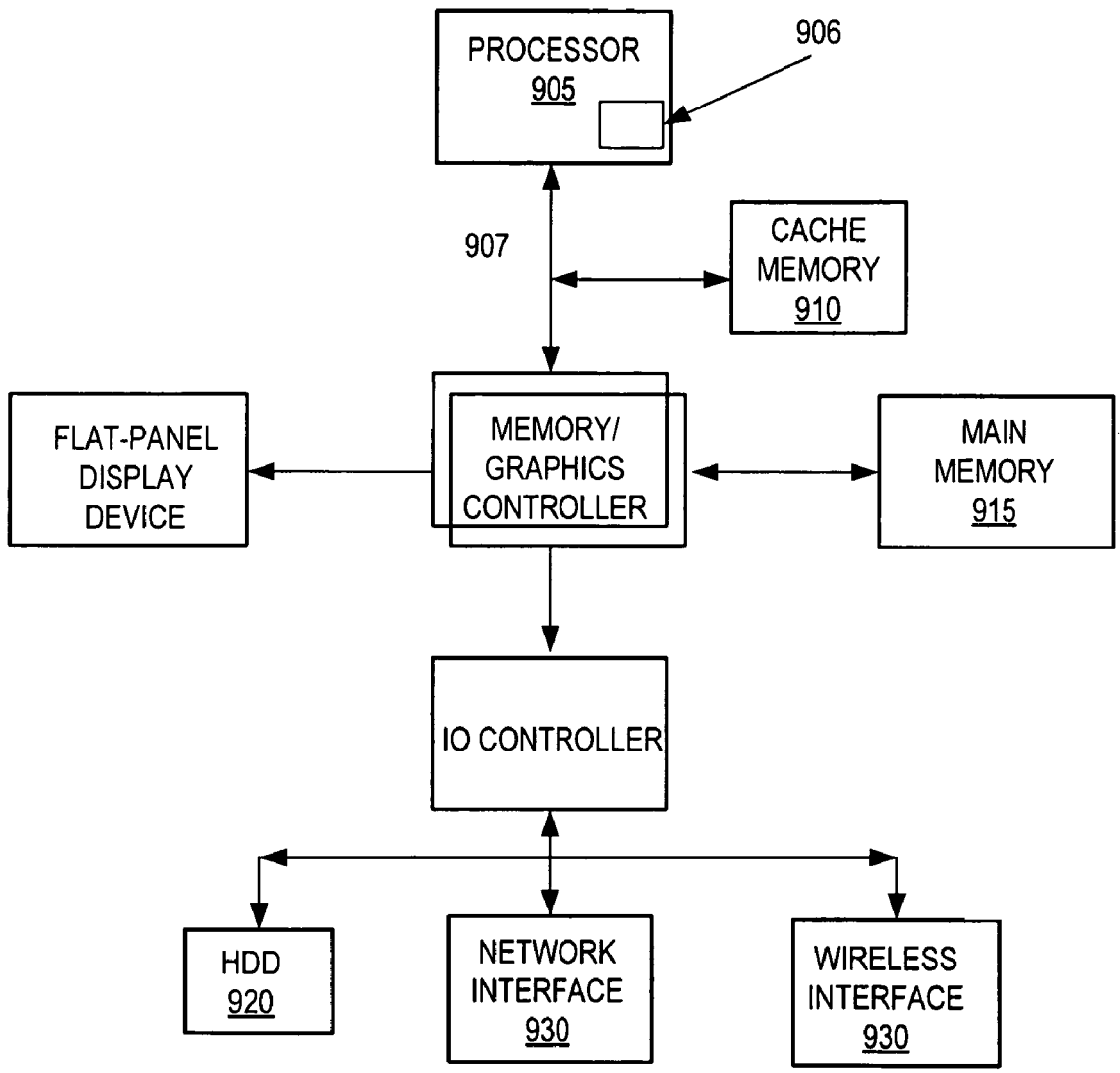
FIG. 9 illustrates an exemplary front-side-bus (FSB) computer system in which one embodiment of the invention may be used.

FIG. 9, for example, illustrates a front-side-bus (FSB) computer system in which one embodiment of the invention may be used. A processor 905 accesses data from a level one (L1) cache memory 910 and main memory 915. In other embodiments of the invention, the cache memory may be a level two (L2) cache or other memory within a computer system memory hierarchy. Furthermore, in some embodiments, the computer system of FIG. 9 may contain both a L1 cache and an L2 cache.

The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 920, or a memory source located remotely from the computer system via network interface 930 containing various storage devices and technologies. The cache memory may be located either within the processor or in close proximity to the processor, such as on the processor's local bus 907.

Figure 10:
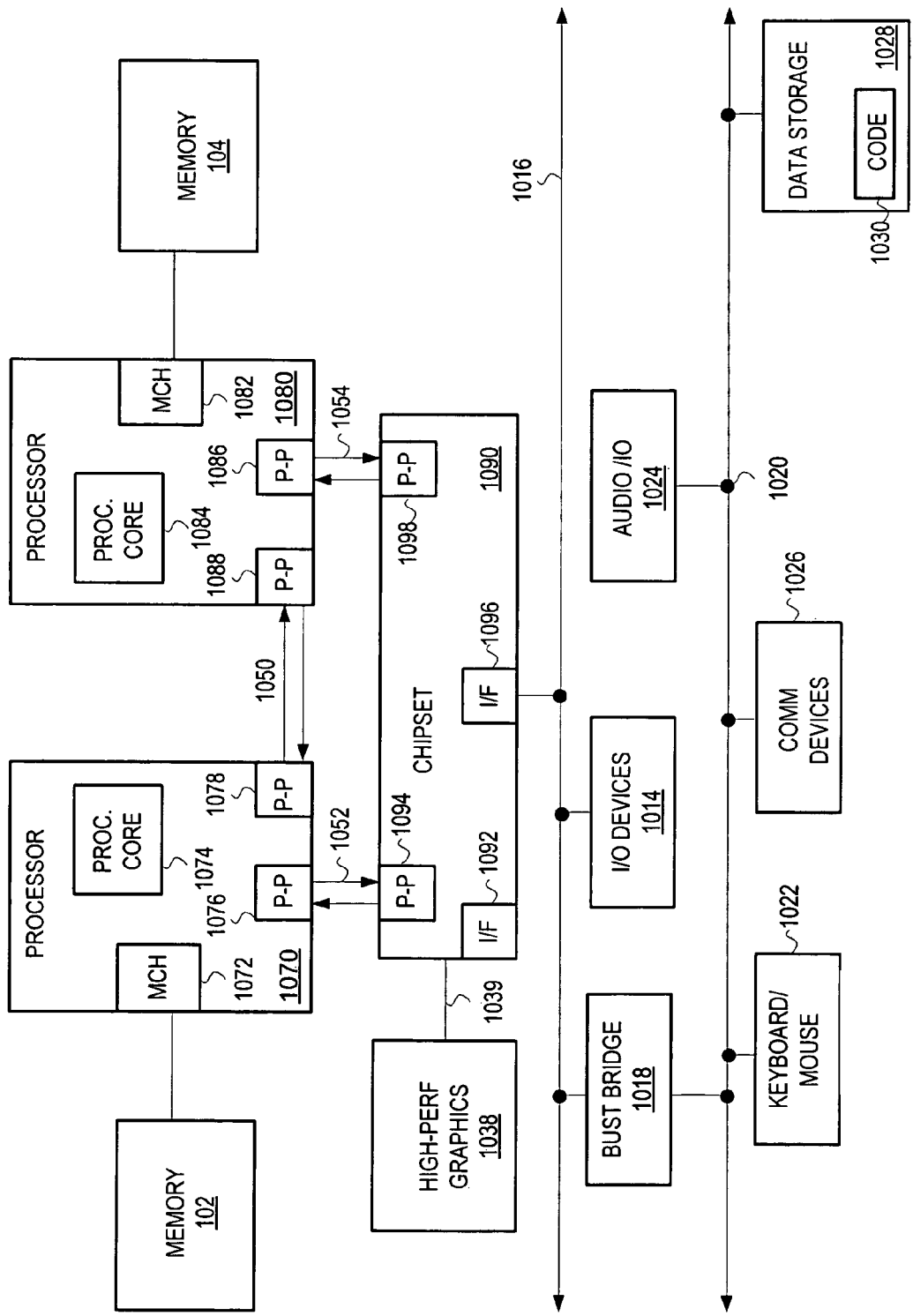
FIG. 10 illustrates an exemplary computer system that is arranged in a point-to-point configuration.

Furthermore, the cache memory may contain relatively fast memory cells, such as a six-transistor (6T) cell, or other memory cell of approximately equal or faster access speed. The computer system of FIG. 9 may be a P2P network of bus agents, such as microprocessors, that communicate via bus signals dedicated to each agent on the P2P network. FIG. 10 illustrates a computer system that is arranged in a P2P configuration. In particular, FIG. 10 shows a system where processors, memory, and input/output devices are interconnected by a number of point-to-point interfaces.

The system of FIG. 10 may also include several processors, of which only two, processors 1070, 1080 are shown for clarity. Processors 1070, 1080 may each include a local memory controller hub (MCH) 1072, 1082 to connect with memory 102, 104. Processors 1070, 1080 may exchange data via a P2P interface 1050 using P2P interface circuits 1078, 1088. Processors 1070, 1080 may each exchange data with a chipset 1090 via individual P2P interfaces 1052, 1054 using P2P interface circuits 1076, 1094, 1086, 1098. Chipset 1090 may also exchange data with a high-performance graphics circuit 1038 via a high-performance graphics interface 1039.

Other embodiments of the invention, however, may exist in other groups of circuits, logic units, or devices within the system of FIG. 10. Accordingly, the scope of the invention should be judged in terms of the claims which follow.

What is claimed is:

1. An apparatus, comprising:
a semiconductor chip having a memory controller and circuitry to implement a home agent to receive/forward cache requests from/to multiple cache agents within a computing system, a network separating said cache agents and said home agent, said home agent comprising:
  i) a directory to keep track of information being cached within said computing system including identifying specific items of said information being cached and the specific ones of said multiple cache agents that are caching said specific items;
  ii) a table to keep track of pending cache requests amongst said multiple cache agents;
  iii) a queue to store cache requests that could not be serviced by said home agent when said home agent received them.

2. The apparatus of claim 1 further comprising:
an interface to a main memory, said home agent to fetch requested information from said main memory that is not kept track of within said directory.

3. The apparatus of claim 1 wherein said network has a networking layer.

4. The apparatus of claim 1 wherein said home agent is to place a received cache request in said queue if said received cache request targets a cache agent that is currently engaged in another cache request.

5. The apparatus of claim 1 wherein said home agent is to send an End Request message to a requesting cache agent in response to a Response message being received from a responsive cache agent that said directory indicates is caching information requested by said requesting cache agent, said Response message indicating that said responsive cache agent has sent said information requested by said requesting cache agent to said caching request agent through said network.

6. The apparatus of claim 1 wherein said host agent is to, in response to receiving a Conflict message from a targeted cache agent, delay sending a second Snoop message for a particular request transaction to said targeted cache agent until said home agent receives an End Conflict message from said targeted cache agent.

7. A method, comprising:
performing the following at a home agent implemented with circuitry on semiconductor chip having a memory controller:
  receiving a request from a first caching agent for first cached information;
  referring to a directory to identify a second caching agent where said first cached information is cached;
  sending a Snoop message to said second caching agent that identify said first caching agent and said first cached information;
  receiving a second request from a third caching agent that targets said second caching agent;

referring to a table that lists pending response/request transactions to recognize that said request's transaction is still pending; and, entering said second request in a queue.

8. The method of claim 7 further comprising:

sending an End Request message to said first caching agent to signify completion of said Snoop request; and, sending a second Snoop request to said second caching agent.

9. The method of claim 7 further comprising:

receiving a third request for information;

referring to said directory to recognize that said information is not cached; and, fetching said information from a main memory coupled to said home agent to respond to said third request.

10. The method of claim 7 wherein said first caching agent, said second caching agent and said home agent are separated by a network having a networking layer.

11. The method of claim 7 further comprising:

receiving a third request that targets said first caching agent;

referring to said table to recognize that said request's transaction is still pending; and, entering said third request in said queue.

12. The method of claim 7 further comprising:

in response to receiving a Conflict message from a targeted cache agent, delaying the sending of a second Snoop message for a particular request transaction to said targeted cache agent until said home agent receives an End Conflict message from said targeted cache agent.

13. A computing system, comprising:

a network having a networking layer separating multiple cache agents each having an associated processor and a home agent implemented with circuitry on a semiconductor chip having a memory controller, said home agent comprising:

i) a directory to keep track of information being cached within said computing system including identifying specific items of said information being cached and the specific ones of said multiple cache agents that are caching said specific items;

ii) a table to keep track of pending cache requests amongst said multiple cache agents;

iii) a queue to store cache requests that could not be serviced by said home agent when said home agent received them.

14. The computing system of claim 13 further comprising:

an interface to a main memory, said home agent to fetch requested information from said main memory that is not kept track of within said directory.

15. The computing system of claim 13 wherein said home agent is to place a received cache request in said queue if said received cache request targets a cache agent that is currently engaged in another cache request.

16. The computing system of claim 13 wherein said home agent is to send an End Request message to a requesting cache agent in response to a Response message being received from a responsive cache agent that said directory indicates is caching information requested by said requesting cache agent, said Response message indicating that said responsive cache agent has sent said information requested by said requesting cache agent to said caching request agent through said network.

17. The computing system of claim 13 wherein said home agent is to, in response to receiving a Conflict message from a targeted cache agent, delay sending second a Snoop message for a particular request transaction to said targeted cache agent until said home agent receives an End Conflict message from said targeted cache agent.

* * * * *